United States Patent

[11] 3,627,926

[72] Inventor James William Nichols
237 E. 72nd St., New York, N.Y. 10021
[21] Appl. No. 744,905
[22] Filed July 15, 1968
[45] Patented Dec. 14, 1971

[54] DESIGN GENERATION UTILIZING MOVING IMAGES
2 Claims, 11 Drawing Figs.

[52] U.S. Cl. .................................................. 178/7.86,
40/106.52, 40/133 A, 35/28, 272/8 P
[51] Int. Cl. ....................................................... H01j 29/89
[50] Field of Search ........................................... 272/10, 8, 8
M, 8 N, 8 F, 8 D, 8 P, 8.5, 15, 20; 40/133, 133 A,
106.52, 106.51, 106.53; 35/26, 28; 273/157 A;
350/276; 178/7.86, 7.85

[56] References Cited
UNITED STATES PATENTS

| 568,260 | 9/1896 | Lawrence | 272/8 N |
| 2,126,729 | 8/1938 | Bugge | 40/106.53 |
| 2,665,608 | 1/1954 | Clark | 35/26 UX |
| 2,888,857 | 6/1959 | Stevenson et al. | 272/8.5 X |
| 3,166,973 | 1/1965 | Healey | 272/8 X |
| 3,418,426 | 12/1968 | Schlegel et al. | 178/7.86 X |
| 3,259,389 | 7/1966 | Blondell | 273/152.1 X |
| 3,465,470 | 9/1969 | Jordan | 272/8 P UX |

FOREIGN PATENTS

| 1,198,344 | 6/1959 | France | 35/26 |
| 635,724 | 9/1936 | Germany | 273/157 |
| 330,518 | 6/1930 | Great Britain | 40/133 A |

Primary Examiner—Anton O. Oechsle
Assistant Examiner—Arnold W. Kramer
Attorney—Samuel Levine

ABSTRACT: A design generator comprising a stack of aligned sheets, one of which has an opaque background with a pattern of clear portions therein and the others are transparent and differently colored. When the assembled stack is placed in front of a screen upon which moving images are projected, the screen being that of a black and white or colored television set, or a black and white or color cinematic projection, components of the projected moving images pass through the patterns of clear portions in the opaque sheet, the black and white or color images being modified by the colored sheets. A viewer looking at the opaque sheet sees a continuously changing pattern of colored designs, as the projected moving images move relative to the design generator.

PATENTED DEC 14 1971
3,627,926
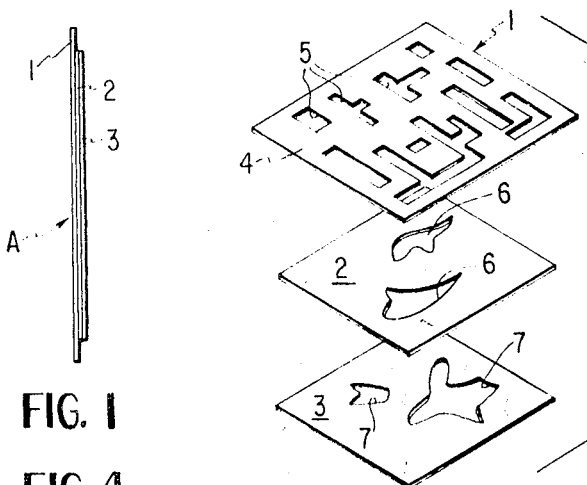
FIG. 1
FIG. 2
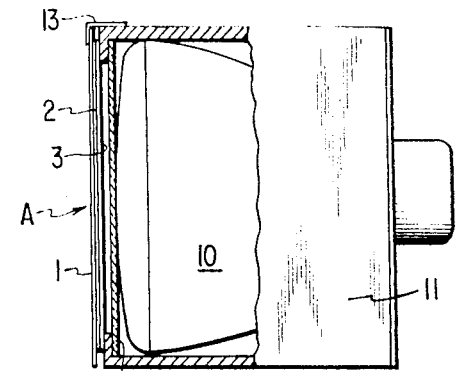
FIG. 3
FIG. 4
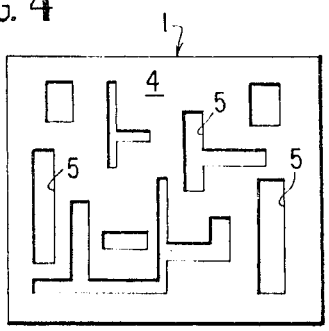
FIG. 5
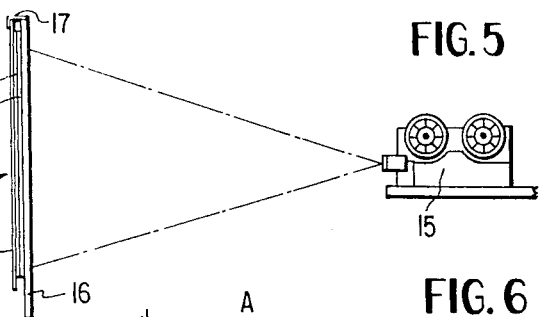
FIG. 6
FIG. 7
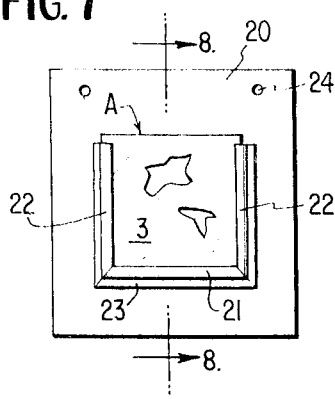
FIG. 8
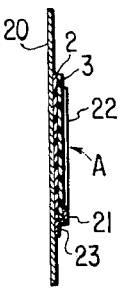
FIG. 9
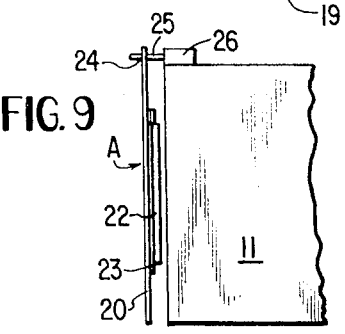
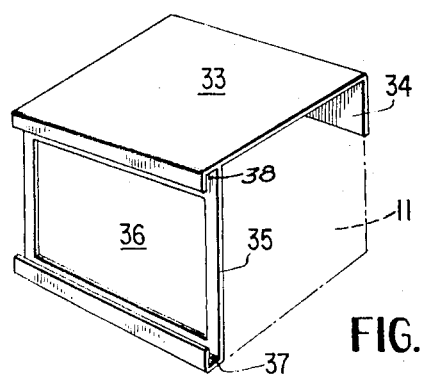
FIG. 10
FIG. 11
INVENTOR
JAMES WILLIAM NICHOLS
BY *Samuel Levine*
ATTORNEY

DESIGN GENERATION UTILIZING MOVING IMAGES

This invention relates to a device for generating a pattern of designs from a moving projected picture.

More particularly, this invention concerns a device, which when placed between a viewer and a screen upon which moving images are projected, converts the motion of the images into continuously changing patterns, lines, shapes and color designs. Thus, the viewer looking toward the screen sees the designs generated by the device. The screen may be the screen of a cathode tube, preferably a conventional television tube, a screen upon which a motion picture is projected by a conventional movie projector, or any type surface which is capable of receiving an optical image.

One of the objects of this invention is to provide a design generator of the type described above which comprises a single sheet, or several stacked sheets of suitable materials, with no moving parts or complicated mechanisms.

A further object is to provide a design generator of the type described above, which generates color designs from black and white moving pictures.

Another object is to provide simple means to attach the design generator to an existing television set, or other type screen.

A further object is to provide attaching means having slot means in which devices having different patterns may be selectively inserted, to thereby obtain different patterns of design formation.

Further objects and advantages will be apparent from the following description and accompanying drawings, in which:

FIG. 1 is an end view of the design generator;

FIG. 2 is an exploded view of the design generator, showing the preferred order of the parts forming the design generator;

FIG. 3 is a part sectional view of a design generator applied to a cathode tube of a television set;

FIG. 4 is a plan view of the pattern sheet of the design generator;

FIG. 5 is a schematic view showing the design generator applied to a movie projection screen;

FIG. 6 is an end view of a modified form of a design generator comprising a single sheet of transparent material;

FIG. 7 is a rear view of a design generator applicable to any size screen;

FIG. 8 is a section view taken on line 8—8 of FIG. 7;

FIG. 9 is a side view showing the design generator of FIGS. 7-8 attached to a television set;

FIG. 10 is a perspective view of a holder for a design generator applicable to a portable-type television set; and FIG. 11 is a perspective view of a holder for a design generator applicable to a console type television set. The design generator A (FIG. 1) comprises a pattern sheet 1, and a number of variously colored transparent sheets may be used, two are shown for exemplary purposes only. Sheets 2 and 3 may be of any transparent material, plastic being preferred.

Pattern sheet 1 has an opaque background 4 and clear or transparent portions 5 of various configurations. The configurations and arrangement of portions 5 give the general pattern of the designs generated. Patten sheet 1 may be constructed of black paperboard, or of thin metal, or of similar simple opaque sheet material. Portions 5 may be cutouts so that sheet 1 is in the form of a stencil, as shown in FIG. 2. Portions 5 are disclosed as being of rectangular shape. However, they may be of any desired shape, such as, curved, triangular, or combinations of various shapes and sizes.

Sheet 1 may also be formed by printing the background 4 in opaque ink on a transparent sheet and leaving portions 5 uninked and, therefore, transparent.

Sheets 2 and 3 are preferably colored plastic sheets. If desired, cutouts 6 and 7 may be formed. Thus, when sheets 1, 2 and 3 are assembled in stacked or aligned relation, as shown in FIG. 1, the color of sheet 2 appears at portions 5, and if a portion 6 aligns with a portion 5 the color of sheet 3 appear at portion 5. The colors of sheets 2 and 3 are selected so that both form a third distinct color. Thus, if sheet 2 is red and sheet 3 is blue, the color transmitted by both would be violet. Therefore, portions 5 may expose a pattern of red, blue and violet colors, and clear areas.

The design generator A is formed by assembling sheets 1, 2 and 3 in a stacked unit, as by bonding the sheets to each other, by stapling, or by other conventional fastening means. If desired, the colored sheets may form a separate unit which may be used selectively with sheets 1 having different patterns of portions 5.

If the design generator is placed to intercept images or light from a still source, portions 5 will be colored and form a pleasing colored, static design.

To obtain continuously changing, flowing and moving designs, the design generator is placed in a position to intercept light from a source or a screen, which projects or receives moving images or pictures. When so intercepted, the intensity of light passing through portions 5 and the parts of the moving pictures passing through portion 5 form flowing colored designs and figurations when viewed through the design generator.

FIG. 3 shows the utilization of a cathode tube as the source of the moving image or picture. The most available cathode tube is represented by tube 10 of television set 11. The design generator is placed preferably adjacent the usual cover glass 12 of the set, and may be supported from the top of the set by a hinge 13 comprising a strip of adhesive material secured to the pattern sheet 1 and top of the cabinet. The designs generated are greatly enhanced if set 11 is a color set, that is, the pictures projected on the screen of tube 10 are in color.

It is apparent that the light passing through sheets 2 and 3 and portion 5 will be colored, whether the picture is black and white, or colored. As the projected picture moves the components thereof passing through portions 5 also move, and thereby, change the color, light intensity and shape of the picture components viewed through the several formations 5. The result is that a person viewing the design generator sees a continuous change of colors, forms, and picture components which appear to flow past portions 5 in varying intensities, shapes and shades.

When the design generator is not utilized, it may be turned on hinge 13 to lie on top of set 11, so that the regular television programs may be viewed.

The design generator may also serve in an ornamental capacity. By adjusting the television set so that only a roster is present, an illuminated colored pattern in sheet 1 will result. If desired, the cutout portions 5 in sheet 1 may assume a pictorial form, and thereby, present an illuminated picture.

FIG. 5 shows the utilization of a conventional movie projector 15 as the source of the moving picture which generates the designs. The picture projected on screen 16 may be from an existing movie film, or a special film having a prearranged color design or pattern may be used.

Pattern sheet 1 may be secured to the screen by magnetic means 17, since most movie screens have a metallic frame member at the top.

Design generator A may also be interposed between projector 15 and screen 16, whereby the formed designs will be projected on screen 16. The position of the design generator is adjusted to project the image of the design pattern on the screen.

It should be noted that with a colored picture, color sheets 2 and 3 may be omitted, since the colors of the moving picture will flow or move past portions 5 of sheet 1 to cause a changing color design at these portions. However, the use of sheets 2 and 3 enhances the final design's effect.

FIG. 6 shows a design generator A having the same components as that of FIGS. 1-5, but formed of a single sheet of transparent material to which the desired layers are applied by printing. Sheet 19, preferably made of a transparent plastic, has a layer 1' printed on its surface. Layer 1' is similar to pattern sheet 1 in that it comprises an opaque background formed by an inked portion, and transparent portions formed by uninked surfaces. Layers 2' and 3' are printed in transparent colored inks on the other side of sheet 19 in proper sequence to deposit the colors and portions 6 and 7 of sheets 2 and 3 of FIGS. 1–5. If desired, all three layers may be printed on the same surface in proper sequence. It is also contemplated within the scope of the invention to print separate plastic sheets to represent layers 1', 2', and 3', and thereafter laminate them into a single plastic unit A.

FIG. 7 shows a holder or support device for the design generator whereby one design generator may be easily removed and replaced by another having a different pattern sheet, or having different-colored sheets. The holder, the rear of which is shown in FIG. 7, comprises a sheet of suitable material, such as paperboard or metal. A pocket means is secured to the rear of sheet 20. The pocket comprises a Z-shaped strip of stiff material bent to form a pocket having bottom 21, sides 22, and open top. The pocket is secured to sheet 20 by bonding flange 23 to sheet 20, as shown in FIG. 8. Sheet 20 has mounting holes 24.

Sheet 20 may have the pattern portions 5 cut out therein in alignment with the pocket, or it may have a window in alignment with the pocket, and a unit A placed in the pocket wit its pattern sheet exposed through the window.

In use, sheet 20 may be trimmed to fit the screen of television set 11 (FIG. 9). Support pins 25 (only one shown) are attached to the top of the set by means of a pressure adhesive on their bases 26. With sheet 20 properly trimmed to size, the holder is supported on the set by pins 25 engaging openings 24.

FIG. 10 shows a design generator holder to be used with a portable-type television set. The holder comprises a boxlike portion 30 which is slipped over the front of the set and adjusted to bring the screen adjacent slot 31. The design generator is inserted in slot 31 and overlies the screen in the manner shown in FIGS. 3 or 9. The holder may be made from cardboard or similar inexpensive material.

FIG. 11 shows a holder for a console-type set. It comprises a panel 33 which rests on top of set 11, with a rear flap 34 to hold it in place. A front panel 35 having a window 36 depends from panel 33. Window 36 is in alignment and adjacent to the front of the set. Panel 35 has groove means 37, 38 formed therein for the reception of a design generator which may be of the type shown in FIGS. 1 and 2 or FIG. 6.

Although certain preferred embodiments of the invention have been disclosed for purpose of illustration, it will be evident that various changes and modifications may be made therein without departing from the scope and spirit of the invention.

I claim:

1. A device for generating a pattern of designs comprising a panel structure consisting of an assembly of aligned layer means, one of which is opaque and has a pattern of clear portions formed therein, and the other layer means comprises sheets of transparent, differently colored material, each of said transparent sheets having a pattern of clear portions, said clear portions of one sheet being not fully aligned with either the clear portions of an adjacent transparent sheet or the clear portions of the opaque layer means, a TV receiver having moving images on its screen, and support means engaging said panel structure and holding the same stationary over said screen having the moving images thereon, whereby components of said moving images pass through the clear portions of said opaque layer means and form various changing design patterns at said clear portions.

2. A device for generating a pattern of designs comprising a panel structure formed of a unitary transparent sheet having a layer embodying opaque-inked and uninked surfaces to thereby provide a pattern of clear portions, and having additional layers superimposed upon said layer, each additional layer being of a different-colored, transparent ink, and embodying uninked surfaces within the layer to provide a pattern of clear portions, the clear portions of each layer being not fully aligned with the clear portions of an adjacent layer, a TV receive having moving images on its screen, and support means engaging said panel structure and holding the same stationary over said screen having the moving images thereon, whereby components of said moving images pass through the clear portions of the opaque ink layer and form various changing design patterns at said clear portions.

* * * * *